Figure 1:
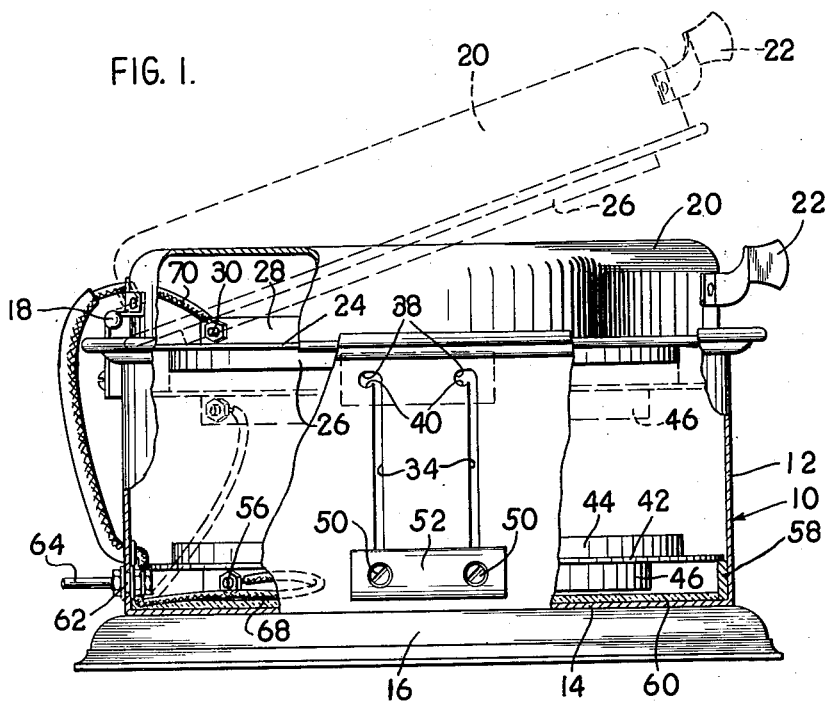

Oct. 16, 1951 — H. R. DAVIS — 2,571,216
ELECTRIC COMBINATION COOKER
Filed Oct. 5, 1949 — 2 Sheets-Sheet 1

INVENTOR
HENRY R. DAVIS
BY Harold K. Martin
ATTORNEY

Oct. 16, 1951        H. R. DAVIS        2,571,216
ELECTRIC COMBINATION COOKER
Filed Oct. 5, 1949        2 Sheets-Sheet 2
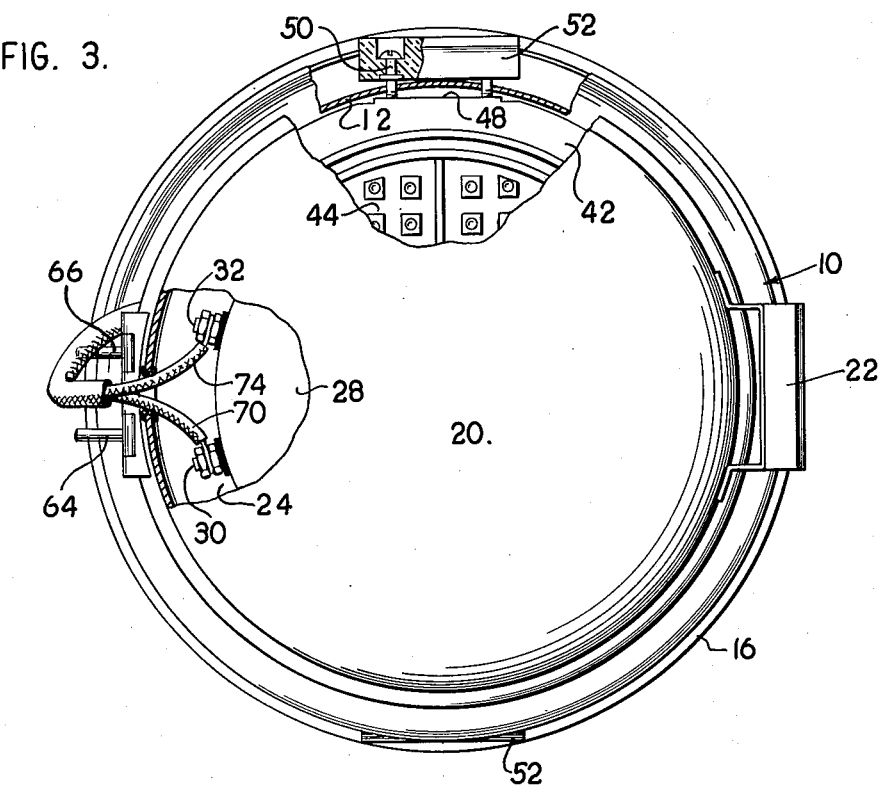
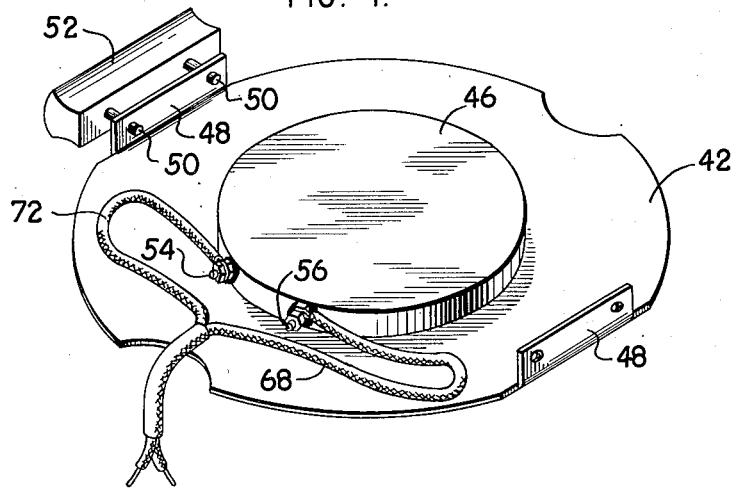
INVENTOR
HENRY R. DAVIS
BY *Harold K. Martin*
ATTORNEY Patented Oct. 16, 1951

2,571,216

UNITED STATES PATENT OFFICE 2,571,216

ELECTRIC COMBINATION COOKER

Henry R. Davis, Knoxville, Tenn.

Application October 5, 1949, Serial No. 119,697

3 Claims. (Cl. 219—19)

This invention relates to a portable combination cooker and more particularly to a conventional waffle iron and bake oven.

The primary object of the invention is to conserve space and facilitate the baking of waffles, pies, cakes and the like employing the same heating elements.

Another object is to provide satisfactory ventilation for the unit when it is being employed for baking purposes, and further to facilitate the changing of the position of the parts according to the use to which the unit is to be employed.

The above and other objects may be attained by employing this invention which embodies among its features a housing, a removable cover for the housing adapted to close the upper end thereof, an electrically heated upper waffle grid carried by the cover and an electrically heated lower waffle grid within the housing and movable from an upper position engaging the upper waffle grid to a lower position in spaced parallel relation to the upper waffle grid.

Other features include vertical slots extending through the housing, means coupled to the lower grid and extending through the slots for moving said lower grid from its lower to its upper position and means adjacent the upper ends of the slots for engaging the grid elevating means and holding the lower grid in raised position against the under side of the upper grid.

Still other features include electrical conductors connected to the heating units of the upper and lower grids and to suitable conductor pins for simultaneously conveying electrical energy through the pins to the grids.

In the drawings—

Figure 2:
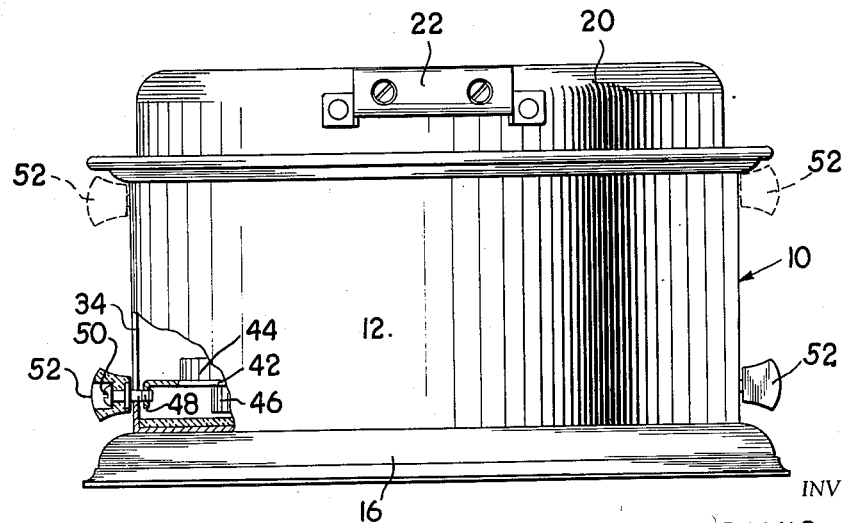

Figure 1 is a side view of a portable combination cooker embodying the features of this invention, certain portions thereof being shown in section more clearly to illustrate certain details of construction, Figure 2 is a front view of the portable combination cooker illustrated in Figure 1 showing a portion broken away to illustrate a fragment of the lower waffle grid and its elevating means, Figure 3 is a top plan view of the portable combination cooker illustrated in Figures 1 and 2 showing portions broken away at different levels to illustrate various details of the invention, and Figure 4 is an inverted perspective view of the lower grid illustrating the electrical connections to the grid heating unit.

Referring to the drawings in detail a housing designated generally 10 comprises in the preferred form of the invention a circular cylindrical side wall 12 having a bottom 14 which is coupled in any conventional manner to a suitable base 16. The upper end of the housing is open and supported in any suitable manner as by a hinge 18, carried by the housing is a hollow cover 20 which is equipped with a conventional handle 22 by which the cover may be raised about the horizontal axis of the hinge 18 as suggested in dotted lines in Figure 1.

Secured within the cover 20 in any suitable manner is a plate 24 carrying on its under side a waffle grid 26. It is obvious that this plate 24 may be formed integrally with the waffle grid 26 should it be so desired. An electrical heating unit 28 is attached to the upper side of the plate 24 in any conventional manner and is equipped with conventional binding posts 30 and 32 to which suitable electrical conductors are attached in a conventional manner. Inasmuch as the waffle grid 26 is fixed in the cover 20, it will be evident that when the latter is tilted, as suggested by the dotted lines in Figure 1, the waffle grid 26 will move in unison therewith.

Formed in the housing 12 are diametrically opposite pairs of spaced vertical slots 34, the upper ends of which open into laterally extending recesses 38, the lower edges 40 of which form rests upon which the lower waffle grid elevating means are supported when the lower waffle grid is in elevated position.

Mounted for vertical movement within the housing 10 is a horizontal plate 42 carrying on its upper face a conventional waffle grid 44 and on its under face a suitable electrical heating element 46. It is obvious that the waffle grid 44 may be unitary with the plate 42 should such construction be so desired. The plate 42 is equipped at diametrically opposite points with downturned flanges 48 in which suitable supporting members 50, such as screws, are entered. These supporting members 50 extend through the slots 34 and carry at their outer ends suitable handles 52 by which the plate 42 and lower waffle grid 44 may be moved upwardly within the housing 10.

The heating element 46 is equipped with conventional binding posts 54 and 56 to which the electrical conductors, to be more fully hereinafter described, are coupled in a conventional manner.

While the lower ends of the slots 34 may serve to limit downward movement of the lower waffle grid and hold the electrical heating element 46 in spaced relation to the bottom 14 of the housing 10, I prefer also to provide at spaced intervals within the housing suitable stop blocks 58 and lying on the bottom 14 of the housing 10 is a suitable pad 60 of thermal insulating material. The housing is provided adjacent its bottom 14 with a pair of spaced openings supporting suitable insulating bushings 62 through which spaced contact pins 64 and 66 project. These pins 64 and 66 are of conventional form such as are commonly employed on household electrical appliances and coupled to the pin 64 are flexible electrical conductors 68 which lead to the binding post 56 while a branch 70 thereof leads to the binding post 30. A similar flexible conductor 72 is coupled to the binding post 54 and to the contact pin 66 while a branch 74 of said conductor 72 leads to the binding post 32. It will thus be seen that when the pins 64 and 66 are coupled to a source of electrical energy, the heating elements 28 and 46 will be energized simultaneously. It is obvious that any suitable thermostatic regulatory means (not shown) may be employed in the electrical circuit to control the temperature of the units.

In use when it is desired to employ the device as a waffle iron, the handles 52 are grasped and the grid 44 is moved upwardly as suggested in the broken lines in Figure 1, so that its upper surface contacts the under surface of the grid 26. By imparting to the handles 52 a slightly clockwise rotary movement when the supporting members 50 are at the upper ends of the slots 34, it is evident that the supporting members will enter the recess 38 and engage the lower edges 40 thereof thus to hold the lower waffle grid 44 against the under side of the upper waffle grid 26. With the parts in this position, it is evident that upon energizing the heating units 26 and 46, the device may be used as a waffle iron. For baking pies, cakes and the like, the handles 52 are grasped and by exerting slight upward pressure thereon and moving said handles for a short distance in a counter-clockwise position, it is obvious that the supporting members 50 may be moved into a position to enter the slots 34 so that the lower grid 44 may be moved into the position illustrated in the full lines in Figure 1, so that the plate 42 rests on the stops 58 and supports the lower heating unit 46 in spaced relation to the insulating pad 60. This provides an air space between the under side of the heating unit 46 and the bottom 14 of the housing 10 so as to allow air circulation and avoid over heating the bottom 14 and possible burning of the surface upon which the device is supported. Upon connecting the pins 64 and 66 with a suitable source of electrical energy, the heating elements 28 and 46 will be energized so that upon raising the cover 20, as suggested by the dotted lines in Figure 1, and introducing an article to be baked into the housing, an effective oven is produced.

Ventilation of the oven is achieved through the slots 34, which thus serve a double purpose of providing ventilation for the device when it is used as an oven and serving as guides during the raising or lowering operation of the lower waffle grid 44.

What is claimed is:

1. In a combination cooker a housing, a movable cover carried by said housing for closing the upper end thereof, an electrically heated upper waffle grid carried by the cover, an electrically heated lower waffle grid within said housing, said lower grid being movable within said housing from an upper position engaging the upper waffle grid to a lower horizontal position in spaced relation to said upper waffle grid, said housing having diametrically opposed pairs of vertical spaced parallel slots extending therethrough, supporting members carried by the lower waffle grid and extending through the slots, handles carried by the supporting members on the exterior of the housing for moving the lower grid upwardly and into engagement with the under side of the upper grid, and means adjacent the upper ends of the slots for engaging the supporting members and holding the lower grid against tilting when it is in elevated position.

2. In a portable combination cooker a housing, a movable cover carried by said housing for closing the upper end thereof, an upper waffle grid carried by the cover, electrical heating means carried by said upper waffle grid, a lower waffle grid within the housing, said lower waffle grid being movable within said housing from an upper position engaging the upper waffle grid to a lower horizontal position in spaced relation to said upper waffle grid, electrical heating means carried by said lower waffle grid, conductors connected to both electrical heating means simultaneously to conduct electrical energy thereto, said housing having pairs of spaced vertical slots extending therethrough, means carried by the lower waffle grid and extending through said slots for elevating said lower waffle grid, and means adjacent the upper ends of the slots for engaging the lower grid elevating means and holding said lower waffle grid against tilting and in contact with the upper waffle grid.

3. In a portable combination cooker a housing, a movable cover carried by said housing for closing the upper end thereof, an upper waffle grid carried by the cover, electrical heating means carried by said upper waffle grid, a lower waffle grid within the housing, said lower waffle grid being movable within said housing from an upper position engaging the upper waffle grid to a lower horizontal position in spaced relation to said upper waffle grid, electrical heating means carried by said lower waffle grid, conductors connected to both electrical heating means simultaneously to conduct electrical energy thereto, said housing having opposed pairs of spaced vertical slots extending therethrough, supporting members carried by the lower waffle grid and extending through the slots, handles carried by the supporting members on the exterior of the housing for moving said lower waffle grid vertically within the housing, and means adjacent the upper ends of the slots for engaging the supporting members and holding the lower waffle grid in contact with the upper waffle grid and against tilting when elevated.

HENRY R. DAVIS.

REFERENCES CITED

The following references are of record in the file of this patent:

UNITED STATES PATENTS

| Number | Name | Date |
| --- | --- | --- |
| 1,814,942 | Mabey | July 14, 1931 |
| 1,955,867 | Wilkie et al. | Apr. 24, 1934 |
| 1,968,404 | Knapp | July 31, 1934 |
| 2,012,546 | Reinhardt | Aug. 27, 1935 |
| 2,031,259 | Fox | Feb. 18, 1936 |
| 2,108,778 | Morgan | Feb. 15, 1938 |

FOREIGN PATENTS

| Number | Country | Date |
| --- | --- | --- |
| 621,768 | Germany | Nov. 13, 1935 |